R. W. CORBIN.
TAIL HOLDER FOR CATTLE.
APPLICATION FILED OCT. 31, 1914.

1,192,390.

Patented July 25, 1916.

WITNESSES

INVENTOR
Ralph W. Corbin
BY
F. N. Gilbert
ATTORNEY

UNITED STATES PATENT OFFICE.

RALPH W. CORBIN, OF BAINBRIDGE, NEW YORK.

TAIL-HOLDER FOR CATTLE.

1,192,390.  Specification of Letters Patent.  Patented July 25, 1916.

Application filed October 31, 1914. Serial No. 869,587.

*To all whom it may concern:*

Be it known that I, RALPH W. CORBIN, a citizen of the United States, residing at Bainbridge, in the county of Chenango and State of New York, have invented certain new and useful Improvements in Tail-Tolders for Cattle, of which the following is a specification.

My invention relates to an improvement in tail holders for cattle, for holding the tails of animals while being milked and which may be readily operated and removed and it has for its object to provide a light easily manufactured device which can be operated by the one hand of the operator and which can be applied to an animal by the use of one hand of the operator and likewise removed and which is easily manufactured and will not cause injury to the animal and can be manufactured at low cost for the purposes specified.

With these objects in view my invention consists in certain novel features of construction and arrangement of parts as will be hereinafter fully described and pointed out in the claims, reference being had to the accompanying drawings in which—

Figure 1:
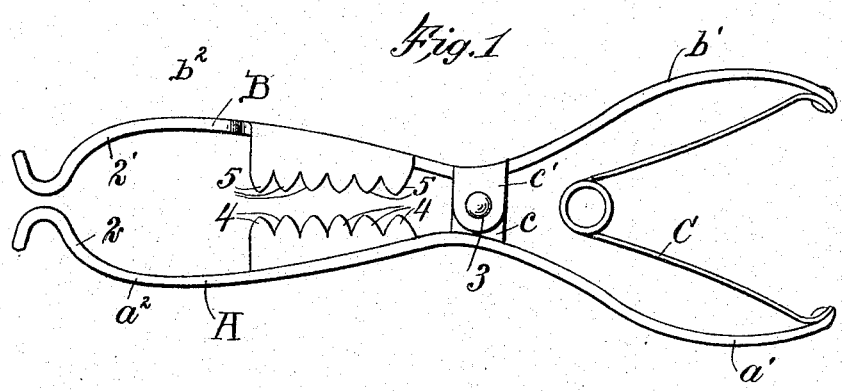
Figure 2:
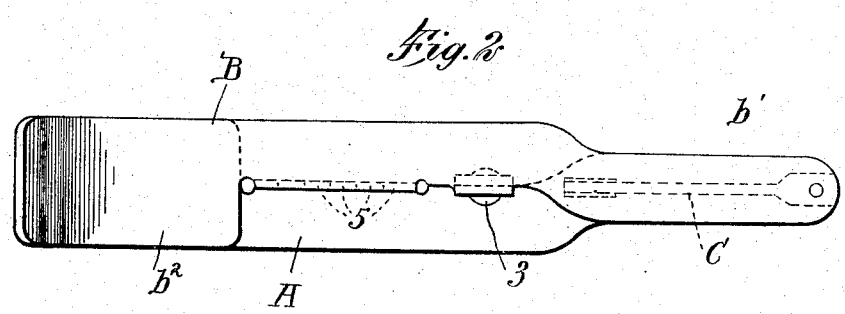
Figure 3:
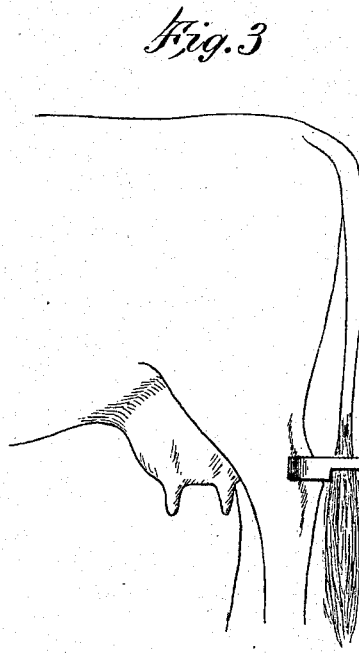

Figure 1 is a plan view of my device. Fig. 2 is a side view of my device. Fig. 3 is a view of my device in perspective as applied to an animal.

The same reference characters denote like parts in each of the several figures of the drawings.

In carrying out my invention, I provide opposite jaws A and B. The jaw A has a handle projection $a'$ and has at its opposite end the curved formation 2, also having projecting inwardly therefrom a flange 4 having the series of teeth 4'. 4'. 4', &c., and also vertically projecting therefrom the lug $c$ through which is mounted a pivot 3; also opposite the jaw A I have the jaw B having the handle projection $b'$ and at its opposite end the curved formation 2' and projecting therefrom I have the lug $c'$ and projecting inwardly from said jaw the flange 5 having the series of teeth 5'. 5'. 5'; said teeth projecting on the inner line of the recess formation in said jaw, the jaw A having a similar recess formation.

The lugs $c$ and $c'$ have mounted between them the pivot 3. Between the handle projections $a'$ and $b'$ I have the spring C which may be of any convenient form, either of spiral formation or of the formation as shown in Fig. 1. I have elected to use any convenient form of spring. On the curved portion of the jaw B I have the side extension $b''$ and on the jaw A I have the opposite side extension $a''$.

In the operation of my device I open the jaws A and B and place the curved portions 2 and 2' over the gambrel portion of the hind leg of the animal and place the tail end between the teeth rows 4. 4. 4 and 5. 5. 5. The teeth thus engaging the tail end hold the same firmly and prevent the same being switched or moved. When I have finished milking I open the jaw members A and B and remove the holder.

Having thus described my invention, what I claim as new and for which I desire Letters Patent is as follows:

1. A device of the class described comprising a pair of spring operated jaws, said jaws terminating at one end in rounded portions for engagement with the hind leg of a cow and at the other end in handle portions, an inwardly directed flange carried by each jaw, said flanges being disposed opposite to each other and provided at their free ends with serrations for engagement with the tail of the cow, inwardly directed pivot ears carried by each jaw member, a pivot pin extending through said pivot ears whereby the jaw members are pivotally secured together and a spring interposed between the handle portions of the jaw members for normally bringing together the rounded portions of the jaws and the flanges to clamp the leg and tail of the cow.

2. A device of the class described comprising a pair of jaw members formed of sheet metal each jaw member being provided at one end with a rounded portion for engaging the leg of a cow, flange members bent inwardly from each jaw member and disposed opposite each other, the free ends of said flanges being serrated and adapted to lie in close proximity to each other when the jaw members are in normal position to engage the tail of the cow, pivot ears extending inwardly from the jaw members, a pivot pin passing through said pivot ears and a spring interposed between the jaw members for normally bringing together the rounded portions of the jaw and flanges to clamp the leg and tail of the cow.

In testimony whereof I have affixed my signature in presence of two witnesses.

RALPH W. CORBIN.

Witnesses:
E. A. JOYNER,
M. F. TERRY.